US008058809B2

(12) United States Patent
Li et al.

(10) Patent No.: US 8,058,809 B2
(45) Date of Patent: Nov. 15, 2011

(54) CIRCUITS AND METHODS FOR BALANCING CURRENT AMONG MULTIPLE LOADS

(75) Inventors: Youling Li, Shenzhen (CN); Sheng Tai Lee, Taipei (TW); Yingpeng Hu, Shenzhen (CN)

(73) Assignee: O2Micro, Inc., Santa Clara, CA (US)

( * ) Notice: Subject to any disclaimer, the term of this patent is extended or adjusted under 35 U.S.C. 154(b) by 537 days.

(21) Appl. No.: 12/215,937

(22) Filed: Jul. 1, 2008

(65) Prior Publication Data

US 2009/0009097 A1    Jan. 8, 2009

Related U.S. Application Data

(60) Provisional application No. 60/958,221, filed on Jul. 2, 2007.

(51) Int. Cl.
*H05B 37/00* (2006.01)

(52) U.S. Cl. ............... 315/209 R; 315/210; 315/220; 315/255; 315/291; 315/312

(58) Field of Classification Search ............ 315/209 R, 315/210, 219, 220, 224, 225, 226, 250, 255, 315/276, 277, 283, 291, 307, 308, DIG. 5, 315/DIG. 7; 345/102; 349/69, 65, 70

See application file for complete search history.

(56) References Cited

U.S. PATENT DOCUMENTS

| | | | | |
|---|---|---|---|---|
| 6,459,216 | B1 * | 10/2002 | Tsai | 315/294 |
| 7,126,289 | B2 * | 10/2006 | Lin et al. | 315/308 |
| 7,221,345 | B2 * | 5/2007 | Lee et al. | 345/87 |
| 7,242,147 | B2 * | 7/2007 | Jin | 315/177 |
| 7,425,949 | B2 * | 9/2008 | Lin et al. | 345/211 |
| 2004/0056830 | A1 * | 3/2004 | Lee et al. | 345/87 |
| 2007/0030109 | A1 * | 2/2007 | Kohno | 336/208 |
| 2008/0067944 | A1 * | 3/2008 | Wang et al. | 315/185 R |
| 2008/0303449 | A1 * | 12/2008 | Ashikaga | 315/224 |

* cited by examiner

*Primary Examiner* — Douglas W Owens
*Assistant Examiner* — Thai Pham

(57) ABSTRACT

A circuit comprises a power tank, a pair of transformers and multiple loads. The power tank converts a DC input voltage to an AC voltage. The pair of transformers comprise a pair of primary windings and a pair of secondary windings and transform the intermediate AC voltage to an output AC voltage. The pair of primary windings are coupled to the power tank for receiving the intermediate AC voltage, and the pair of secondary windings provide the output AC voltage. The loads are coupled to the pair of secondary windings for receiving the output AC voltage. The pair of secondary windings are serially coupled to each other through the series-coupled loads to achieve current balance among the loads.

23 Claims, 5 Drawing Sheets

CIRCUITS AND METHODS FOR BALANCING CURRENT AMONG MULTIPLE LOADS

RELATED APPLICATION

This application claims priority to U.S. Provisional Application No. 60/958,221 filed on Jul. 2, 2007, which is hereby incorporated in its entirety by reference.

TECHNICAL FIELD

The present invention relates to backlight circuits, and more particularly to backlight circuits for liquid crystal displays (LCDs).

BACKGROUND

LCD panels are used in various applications ranging from portable electronic devices to fixed location units, such as video cameras, automobile navigation systems, laptop PCs and industrial machines. The LCD panel itself cannot emit light but must be backlit by a light source. One of the commonly used backlight sources is a cold-cathode fluorescent lamp (CCFL). Usually, a high alternating current (AC) signal is required to ignite and run the CCFL. To generate such a high AC signal from a direct current (DC) power source, e.g., a rechargeable battery, a DC/AC inverter including a power tank and transformers is designed.

In recent years, there has been increasing interest in larger size LCD displays, as required in LCD TV sets and computer monitors, which may require multiple CCFLs to provide necessary illumination. However, conventional circuits for driving multiple CCFLs may suffer from the problem that CCFL currents may not be balanced due to the tolerances of the inverter transformers and the CCFLs. The imbalance of CCFL currents can cause a reduced lifetime of the CCFLs and non-uniformity of the LCD panel brightness.

SUMMARY

Embodiments in accordance with the present invention provide circuits and methods for balancing current among multiple loads. In one embodiment, a circuit comprises a power tank, a pair of transformers and multiple loads. The power tank converts a DC input voltage to an AC voltage. The pair of transformers comprise a pair of primary windings and a pair of secondary windings and transform the intermediate AC voltage to an output AC voltage. The pair of primary windings are coupled to the power tank for receiving the intermediate AC voltage, and the pair of secondary windings provide the output AC voltage. The loads are coupled to the pair of secondary windings for receiving the output AC voltage. The pair of secondary windings are serially coupled to each other through the series-coupled loads to achieve current balance among the loads.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
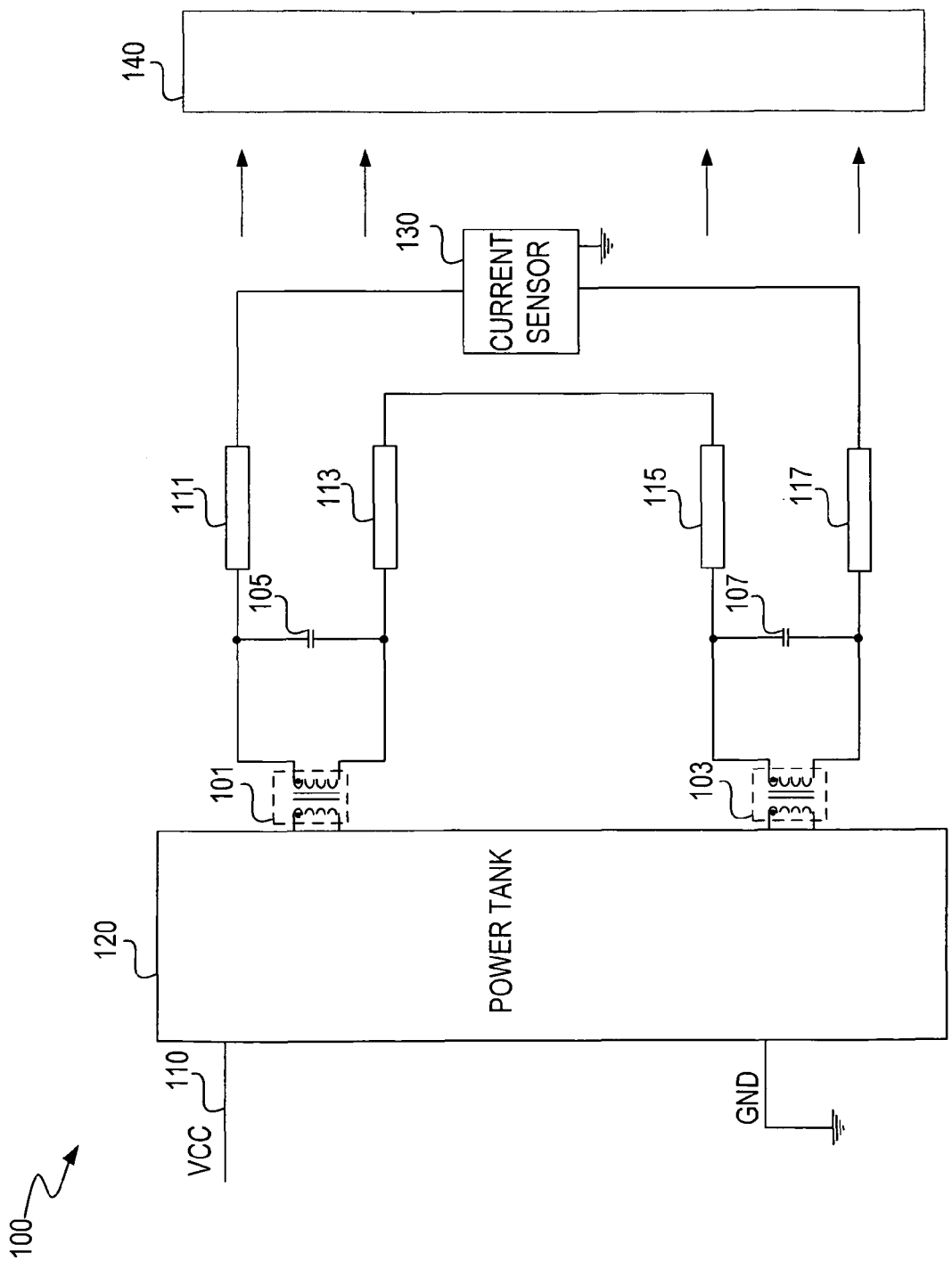
FIG. 1 is a schematic diagram of a circuit 100 for driving a plurality of CCFLs according to one embodiment of the present invention.

FIG. 1 illustrates a schematic diagram of a circuit 100 for driving multiple CCFLs according to one embodiment of the present invention. The circuit 100 includes a power line 110, a power tank 120, transformers 101 and 103, CCFLs 111, 113, 115, and 117, and a current sensor 130. A liquid crystal display panel 140 can be backlit by the CCFLs 111, 113, 115 and 117. The power tank 120 is coupled to parallel-connected primary windings of the transformers 101 and 103. The power tank 120 converts a DC input voltage VCC from the DC power line 110 to an intermediate AC voltage. The intermediate AC voltage is further stepped up by the transformers 101 and 103 to obtain an AC output voltage used for driving the CCFLs 111, 113, 115 and 117. In one embodiment, the circuit 100 can include capacitors 105 and 107 which are respectively coupled in parallel with the secondary windings of the transformers 101 and 103 for purposes of stability.

The CCFLs 111 and 113 are respectively coupled to terminals of the secondary winding of the transformer 101. The CCFLs 115 and 117 are respectively coupled to terminals of the secondary winding of the transformer 103. The CCFL 111 is further coupled in series with the CCFL 117. The CCFL 113 is further coupled in series with the CCFL 115. As such, the CCFLs 111, 113, 115, and 117, and the secondary windings of the transformers 101 and 103 constitute a series-coupled circuit, in one embodiment. Each terminal/end of the secondary winding of transformer 101 or 103 is coupled to the same number of the CCFLs, in one embodiment. In one embodiment, the terminals of the secondary winding of the transformer 101 are coupled to the opposite polarity terminals of the secondary winding of the transformer 103 through the CCFLs. That is, the transformers 101 and 103 are coupled in a series aiding arrangement to allow current to flow in the series-coupled circuit. Advantageously, the current of each component in the series-coupled circuit is substantially identical to each other, resulting in current balance among the CCFLs 111, 113, 115, and 117, in one embodiment. Furthermore, the current balancing solution as shown in the example of FIG. 1 benefits from a reduced component count, and therefore a reduced cost.

In one embodiment, a current sensor 130 can be coupled in the series-coupled circuit and used for sensing a load current. Advantageously, a single current sensor 130 is needed to sense the load current flowing through multiple CCFLs 111, 113, 115, and 117, rather than multiple current sensors for multiple CCFLs, thereby reducing component count and circuit complexity in load current sensing, in one embodiment.

Additionally, according to the sensed load current, a protection circuit (not shown in FIG. 1) can be designed to protect each CCFL from abnormal conditions, such as an open lamp condition, a broken condition, and a short-circuit condition. With the exemplary configuration of FIG. 1, a single sensed load current is processed by the aforementioned protection circuit, as compared to processing multiple sensed currents provided by multiple current sensors. As such, component count and complexity of the protection circuit can be further reduced.

Although the specific schematic diagram of the circuit 100 is described, components recited in FIG. 1 are exemplary. That is, these components can be replaced by others with similar functionality. For example, the present invention is readily applicable to driving other loads, e.g., multiple light emitting diodes (LEDs). Also, any other number of loads, not limited to four CCFLs, can be employed in the present invention.

Figure 2:
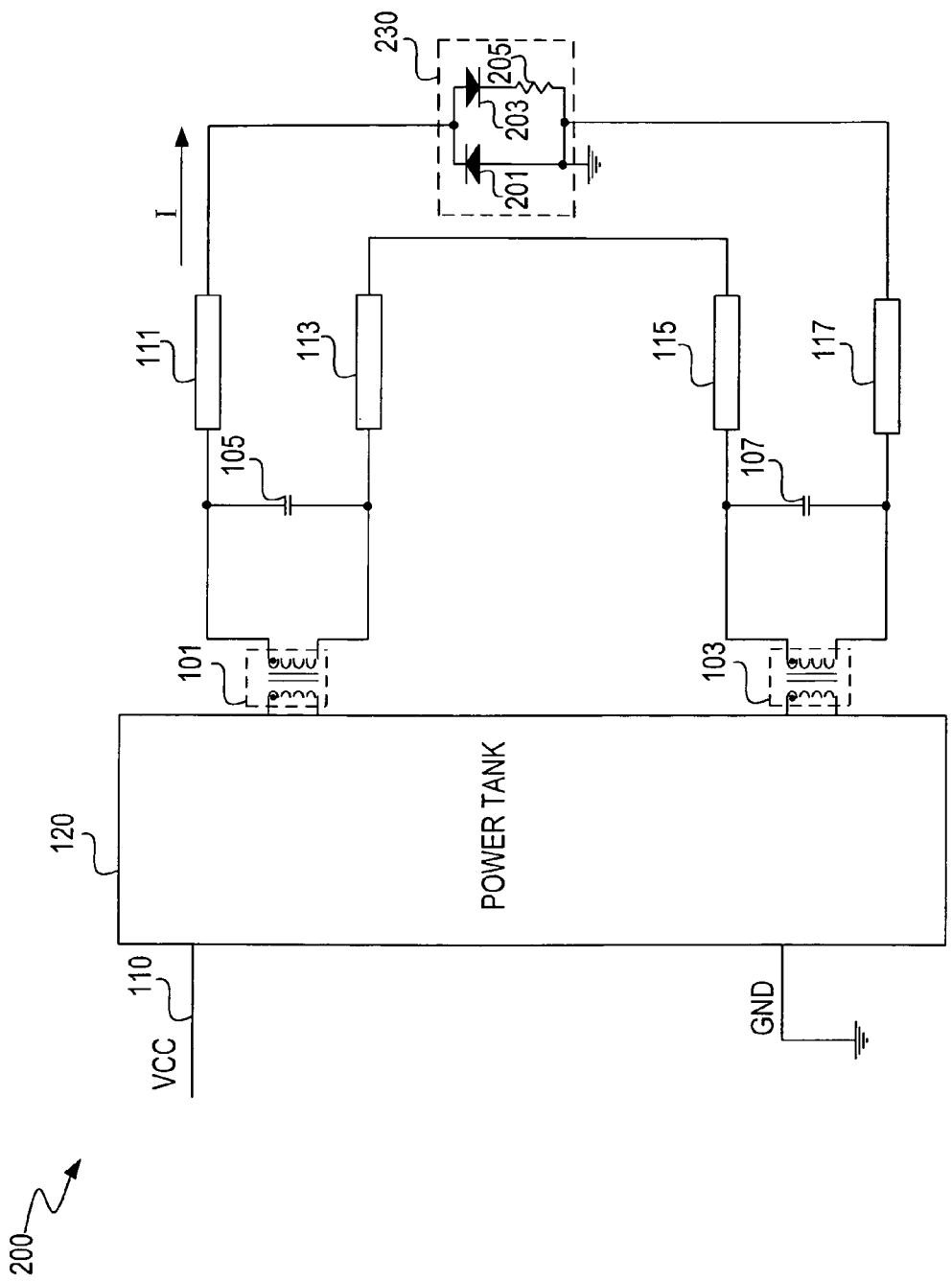
FIG. 2 is a schematic diagram of a circuit 200 for driving a plurality of CCFLs according to one embodiment of the present invention.

FIG. 2 illustrates a schematic diagram of a circuit 200 according to one embodiment of the present invention. Elements labeled the same in FIG. 1 have similar functions and will not be repetitively described herein for purposes of brevity and clarity. The circuit 200 can include a current sensor 230 coupled in series between the CCFLs 111 and 117 for current sensing. In one embodiment, the current sensor 230 can include diodes 201 and 203, and a sense resistor 205.

The sense resistor 205 is coupled in series with the diode 203 for sensing the load current. The series-coupled sense resistor 205 and diode 203 are further coupled in series between the CCFL 111 and the CCFL 117. The diode 201 is coupled in parallel with the series-coupled sense resistor 205 and diode 203. In one embodiment, the cathode of the diode 201 and the anode of the diode 203 are coupled together to the CCFL 111, and the anode of the diode 201 is coupled to ground. As such, while the load current flows in a positive direction as shown by the arrow in FIG. 2, the diode 203 is forward-biased to provide a load current conduction path. Therefore, the load current flows through the sense resistor 205 and the voltage across the sense resistor 205 can indicate the load current flowing through the CCFLs 111, 113, 115 and 117. While the load current flows in a negative direction, which is opposite to the direction shown by the arrow in FIG. 2, the diode 201 is forward-biased to provide the load current conduction path.

Figure 3:
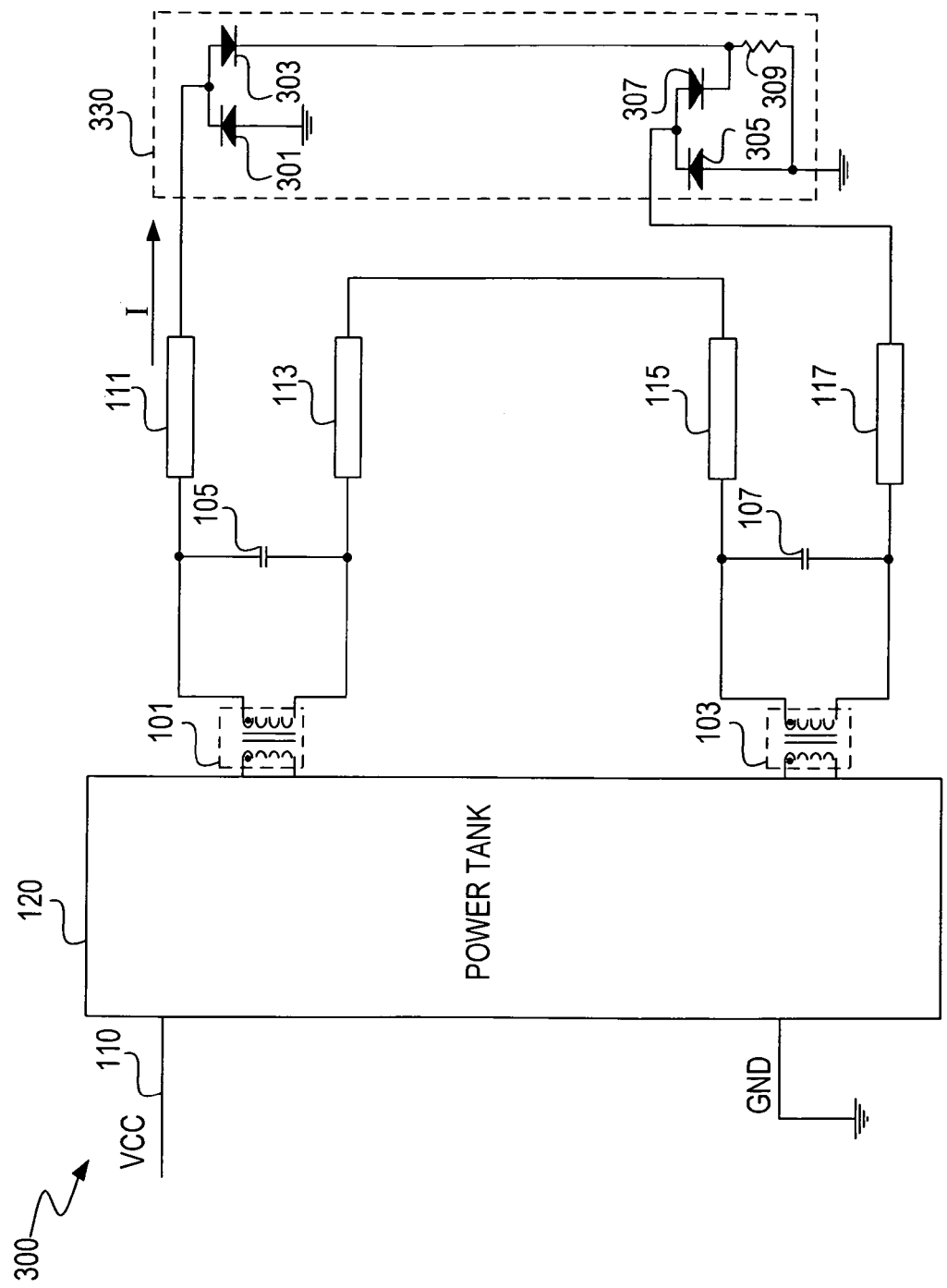
FIG. 3 is a schematic diagram of a circuit 300 for driving a plurality of CCFLs according to one embodiment of the present invention.

FIG. 3 illustrates a schematic diagram of a circuit 300 according to one embodiment of the present invention. Elements labeled the same in FIG. 1 have similar functions and will not be repetitively described herein for purposes of brevity and clarity. The circuit 300 can include a current sensor 330 coupled in series between the CCFLs 111 and 117 for current sensing. In one embodiment, the current sensor 330 can include diodes 301, 303, 305 and 307, and a sense resistor 309.

The cathode of the diode 301 and the anode of the diode 303 are coupled together to the CCFL 111. The cathode of the diode 305 and the anode of the diode 307 are coupled together to the CCFL 117. The cathodes of the diodes 303 and 307 are coupled together to one terminal of the sense resistor 309. The anodes of the diodes 301 and 305 are both coupled to ground, and the other terminal of the sense resistor 309 is also coupled to ground. As such, while the load current flows in a positive direction as shown by the arrow in FIG. 3, the diodes 303 and 305 are forward-biased to provide the load current conduction path. Therefore, the load current flows through the sense resistor 309 and the voltage across the sense resistor 309 indicates the load current flowing through the CCFLs 111, 113, 115 and 117, in one embodiment. While the load current flows in a negative direction, which is opposite to the direction shown by the arrow in FIG. 3, the diode 301 and 307 are forward-biased to provide the load current conduction path. Therefore, the load current flows through the sense resistor 309 and the voltage across the sense resistor 309 indicates the load current flowing through the CCFLs 111, 113, 115 and 117, in one embodiment.

Figure 4:
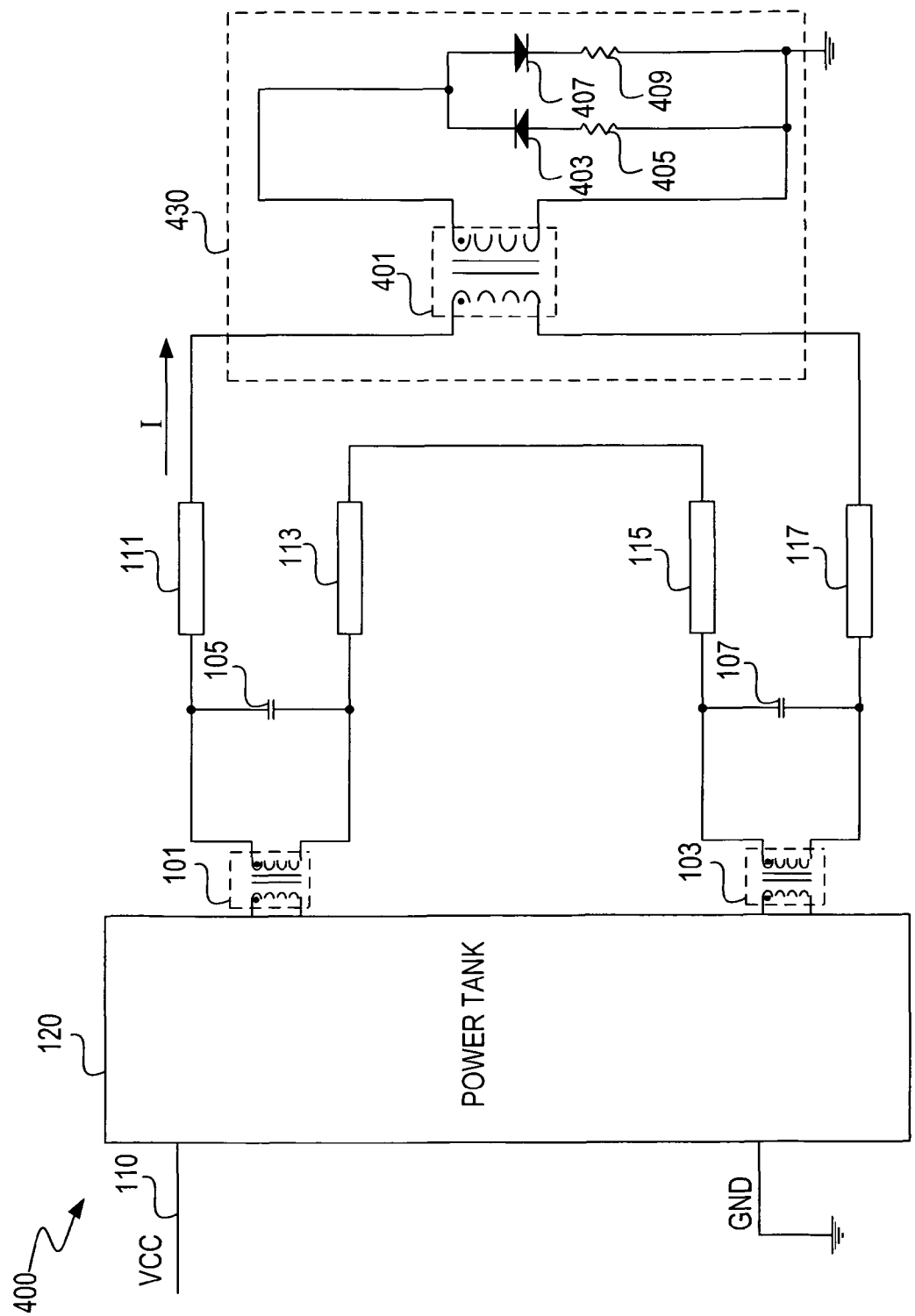
FIG. 4 is a schematic diagram of a circuit 400 for driving a plurality of CCFLs according to one embodiment of the present invention.

FIG. 4 illustrates a schematic diagram of a circuit 400 according to one embodiment of the present invention. Elements labeled the same in FIG. 1 have similar functions and will not be repetitively described herein for purposes of brevity and clarity. The circuit 400 can include a current sensor 430 coupled in series between the CCFLs 111 and 117 for current sensing. In one embodiment, the current sensor 430 can include a sense transformer 401, diodes 403 and 407, and sense resistors 405 and 409.

In one embodiment, the primary and secondary windings of the sense transformer 401 have the same phase. The primary winding of the sense transformer 401 is coupled in series between the CCFLs 111 and 117. One terminal of the secondary winding of the sense transformer 401 is coupled to the cathode of the diode 403 and the anode of the diode 407. The anode of the diode 403 is coupled to ground via the sense resistor 405. The cathode of the diode 407 is coupled to ground via the sense resistor 409. Furthermore, the other terminal of the secondary winding of the sense transformer 401 is also coupled to ground. As such, while the load current flows in a positive direction as shown by the arrow in FIG. 4, the diode 403 is forward-biased to provide a current conduction path. Therefore, the current flows through the sense resistor 405 and the voltage across the sense resistor 405 indicates the load current flowing through the CCFLs 111, 113, 115 and 117, in one embodiment. While the load current flows in a negative direction, which is opposite to the direction shown by the arrow in FIG. 4, the diode 407 is forward-biased to provide the current conduction path. Therefore, the current flows through the sense resistor 409 and the voltage across the sense resistor 409 indicates the load current flowing through the CCFLs 111, 113, 115 and 117, in one embodiment.

Figure 5:
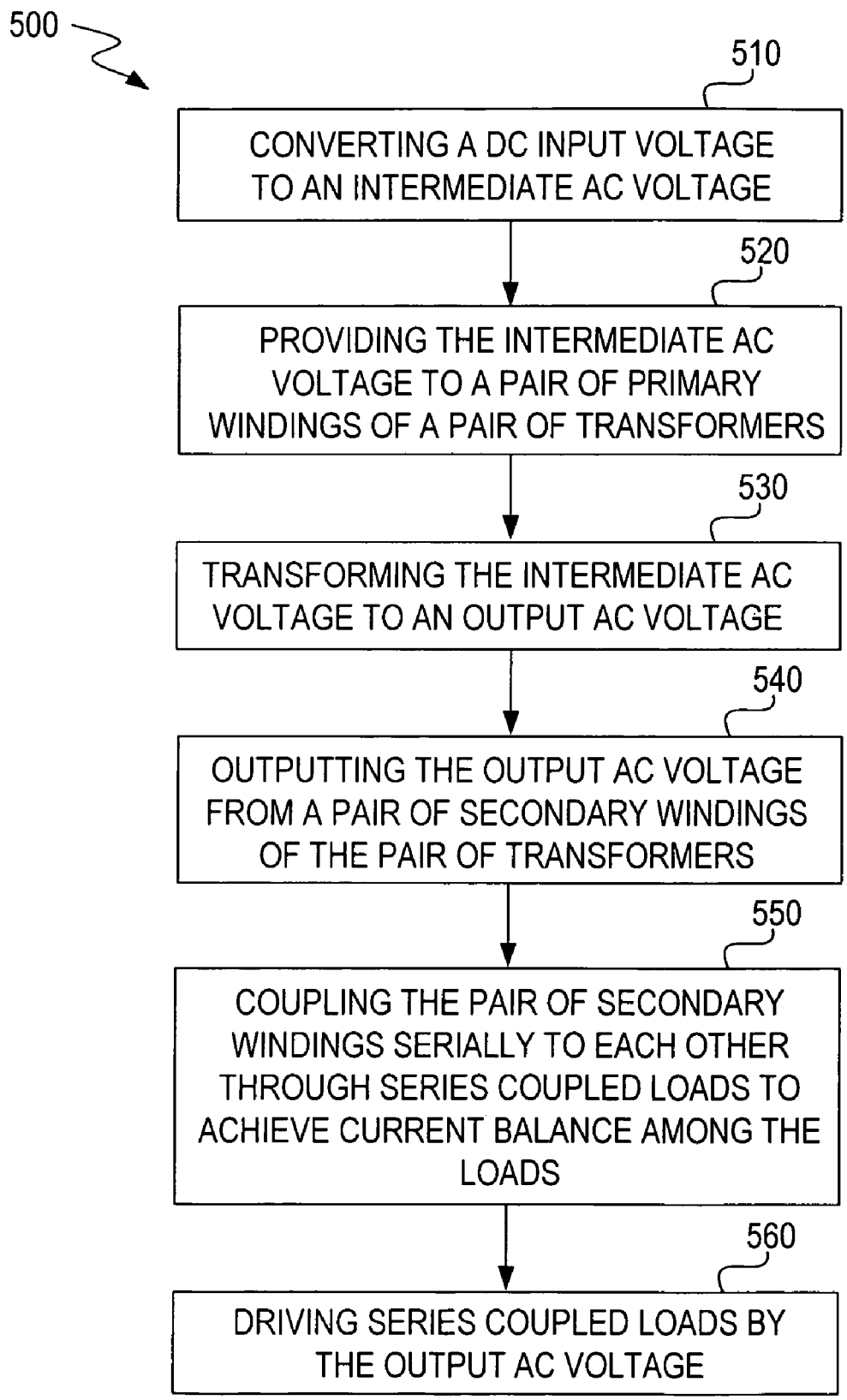
FIG. 5 is a flowchart 500 of a method for driving a plurality of loads according to one embodiment of the present invention.

FIG. 5 illustrates a flowchart 500 of a method for driving multiple loads according to one embodiment of the present invention. Although specific steps are disclosed in FIG. 5, such steps are exemplary. That is, the present invention is well suited to performing various other steps or variations of the steps recited in FIG. 5. FIG. 5 is described in combination with FIG. 1.

In block 510, a DC input voltage is converted into an intermediate AC voltage. In one embodiment, the DC input voltage VCC from the DC power line 110 is converted into the intermediate AC voltage by the power tank 120.

In block 520, the intermediate AC voltage is provided to a pair of primary windings of a pair of transformers. In one embodiment, the power tank 120 is coupled to the parallel-connected primary windings of the transformers 101 and 103, thereby providing the intermediate AC voltage.

In block 530, the intermediate AC voltage is transformed to an output AC voltage. In one embodiment, the intermediate AC voltage is stepped up to the output AC voltage by the pair of transformers 101 and 103.

In block 540, the output AC voltage is outputted from a pair of secondary windings of the pair of transformers. In one embodiment, the output AC voltage is outputted from the secondary windings of the transformers 101 and 103.

In block 550, the pair of secondary windings are serially coupled to each other through the series-coupled loads to achieve current balance among the loads. In one embodiment, the secondary windings of the transformers 101 and 103 are serially coupled to each other through the series-coupled CCFLs 111, 113, 115 and 117. As such, a series-coupled circuit including the secondary windings of the transformers 101 and 103, and the CCFLs 111, 113, 115, and 117, can be formed, resulting in a balanced current among the CCFLs 111, 113, 115, and 117, in one embodiment.

In block 560, the series-coupled loads are driven by the output AC voltage. In one embodiment, the CCFLs 111, 113, 115 and 117 are driven by the output AC voltage provided by the secondary windings of the transformers 101 and 103 in a series aiding arrangement.

In summary, embodiments in accordance with the present invention provide circuits which can achieve current balance among multiple loads with a reduced component count and complexity. Furthermore, the improved current balance solution in accordance with embodiments of the present invention can simplify the current sensor circuit and the protection circuit, which can be important to cost reductions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A circuit comprising:
   a power tank for converting a direct current (DC) input voltage to an intermediate alternating current (AC) voltage;
   a pair of transformers operable for transforming said intermediate AC voltage to an output AC voltage, said pair of transformers comprising a pair of primary windings coupled to said power tank and operable for receiving said intermediate AC voltage, and said pair of transformers further comprising a pair of secondary windings operable for providing said output AC voltage to a plurality of series-coupled light sources,
   wherein said pair of secondary windings are serially coupled to each other with an evenly distributed number of said light sources coupled between to achieve current balance among said series-coupled light sources.

2. The circuit of claim 1, wherein said light sources comprise cold cathode fluorescent lamps (CCFLs).

3. The circuit of claim 1, wherein said pair of secondary windings are coupled in a series aiding arrangement to allow current to flow through said pair of secondary windings.

4. The circuit of claim 1, further comprising:
   a single current sensor coupled in a series circuit comprising said pair of secondary windings and light sources, wherein said single current sensor is operable for sensing a load current flowing through said light sources.

5. The circuit of claim 4, wherein said current sensor comprises:
   a first sense resistor serially coupled to said light sources through a first diode and operable for sensing said load current; and
   a second diode coupled in parallel with said first diode and said first sense resistor.

6. The circuit of claim 5, further comprising:
   a third diode coupled to said first sense resistor and forward biased to provide a current conduction path in said serial circuit if said load current flows in a positive direction; and
   a fourth diode coupled to said first sense resistor and forward biased to provide said current conduction path in said serial circuit if said load current flows in a negative direction.

7. The circuit of claim 4, wherein said current sensor comprises:
   a sense transformer with a primary winding serially coupled to said light sources;
   a first sense resistor serially coupled to a secondary winding of said sense transformer through a first diode and operable for sensing said load current flowing in a positive direction; and
   a second sense resistor serially coupled to said secondary winding of said sense transformer through a second diode and operable for sensing said load current flowing in a negative direction.

8. The circuit of claim 1, wherein said pair of secondary windings comprise a first secondary winding and a second secondary winding, and said plurality of light sources comprise a first plurality of light sources and a second plurality of light sources, wherein said first secondary winding, said first plurality of light sources, said secondary winding, and said second plurality of light sources are all coupled in series, wherein the number of said first plurality of light sources is equal to the number of said second plurality of light sources, and wherein a current flows from said first secondary winding through said first plurality of light sources, said second secondary winding, then said second plurality of light sources and back to said first secondary winding.

9. The circuit of claim 1, wherein said pair of secondary windings comprise a first secondary winding and a second secondary winding, and wherein terminals of said first secondary windings are coupled to opposite polarity terminals of said second secondary winding.

10. A method for driving a plurality of light sources, comprising:
    converting a DC input voltage to an intermediate AC voltage;
    providing said intermediate AC voltage to a pair of primary windings of a pair of transformers;
    transforming said intermediate AC voltage to an output AC voltage;
    outputting said output AC voltage from a pair of secondary windings of said pair of transformers;
    generating a balanced current flowing through a series circuit loop comprising said pair of secondary windings serially coupled to each other with an evenly distributed number of said light sources coupled between; and
    driving said light sources serially coupled to each other by said output AC voltage.

11. The method of claim 10, wherein said light sources comprise cold cathode fluorescent lamps (CCFLs).

12. The method of claim 10, further comprising:
    generating a current flowing through said pair of secondary windings coupled in a series aiding arrangement.

13. The method of claim 10, further comprising:
    sensing a load current flowing through said light sources by a single current sensor coupled in said series circuit loop.

14. The method of claim 10, wherein said pair of secondary windings comprise a first secondary winding and a second secondary winding, and said plurality of light sources comprise a first plurality of light sources and a second plurality of light sources, wherein said first secondary winding, said first plurality of light sources, said secondary winding, and said second plurality of light sources are all coupled in series, wherein the number of said first plurality of light sources is equal to the number of said second plurality of light sources, and wherein said method further comprises:

generating a current flowing from said first secondary winding through said first plurality of light sources, said second secondary winding, then said second plurality of light sources and back to said first secondary winding.

15. The method of claim 10, wherein said pair of secondary windings comprise a first secondary winding and a second secondary winding, and wherein terminals of said first secondary windings are coupled to opposite polarity terminals of said second secondary winding.

16. A system comprising:
   a power tank for converting an input voltage to an intermediate AC voltage;
   a plurality of transformers operable for transforming said intermediate AC voltage to an output AC voltage, said plurality of transformers comprising a plurality of primary windings coupled to said power tank and operable for receiving said intermediate AC voltage, and said plurality of transformers further comprising a plurality of secondary windings operable for providing said output AC voltage;
   a plurality of series-coupled light sources coupled to said plurality of secondary windings for receiving said output AC voltage, wherein said plurality of secondary windings are serially coupled to each other with an evenly distributed number of said light sources coupled between to achieve current balance among said light sources; and
   a liquid crystal display panel backlit by said light sources.

17. The system of claim 16, wherein said light sources comprise cold cathode fluorescent lamps (CCFLs).

18. The system of claim 16, wherein said secondary windings are coupled in a series aiding arrangement to allow current to flow through said secondary windings.

19. The system of claim 16, further comprising:
   a single current sensor coupled in a series circuit including said secondary windings and said light sources, wherein said single current sensor is operable for sensing a load current flowing through said light sources.

20. The system of claim 19, wherein said current sensor comprises:
   a first sense resistor serially coupled to said light sources through a first diode and operable for sensing said load current; and
   a second diode coupled in parallel with said first diode and said first sense resistor.

21. The system of claim 19, wherein said current sensor comprises:
   a sense transformer with a primary winding serially coupled to said light sources;
   a first sense resistor serially coupled to a secondary winding of said sense transformer through a first diode and operable for sensing said load current flowing in a positive direction; and
   a second sense resistor serially coupled to said secondary winding of said sense transformer through a second diode and operable for sensing said load current flowing in a negative direction.

22. The system of claim 16, wherein said plurality of secondary windings comprise a first secondary winding and a second secondary winding, and said plurality of series-coupled light sources comprise a first plurality of light sources and a second plurality of light sources, wherein said first secondary winding, said first plurality of light sources, said secondary winding, and said second plurality of light sources are all coupled in series, wherein the number of said first plurality of light sources is equal to the number of said second plurality of light sources, and wherein a current flows from said first secondary winding through said first plurality of light sources, said second secondary winding, then said second plurality of light sources and back to said first secondary winding.

23. The system of claim 16, wherein said plurality of secondary windings comprise a first secondary winding and a second secondary winding, and wherein terminals of said first secondary windings are coupled to opposite polarity terminals of said second secondary winding.

* * * * *